UNITED STATES PATENT OFFICE 2,545,049

METHOD OF PREPARING CONDENSATION PRODUCTS FROM AN ARYLOXYTRIAZINE

Frederic Charles Schaefer, Stamford, and Dagfrid Holm-Hansen Church, Norwalk, Conn., assignors to American Cyanamid Company, New York, N. Y., a corporation of Maine No Drawing. Application March 30, 1948, Serial No. 18,064

15 Claims. (Cl. 260—249.6)

This invention relates to the preparation of condensation products and more particularly to the production of condensation products from an aryloxytriazine. The invention is concerned specifically with a method of preparing a condensation product, e. g., a substituted melamine, which comprises heating a mixture of (1) a triazine derivative represented by the general formula:

I:

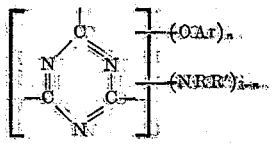

wherein Ar represents a monovalent, monocyclic aromatic hydrocarbon radical bonded to the oxygen atom through a carbon atom of the ring nucleus, R and R' each represents a member of the class consisting of hydrogen and monovalent hydrocarbon radicals and $n$ represents an integer which is at least 1 and not more than 3, and (2) a compound which is different from the compound of (1) and which is an amino compound containing carbon and at least one amino grouping having at least one hydrogen atom, i. e., either one or two hydrogen atoms, attached directly to the nitrogen atom thereof. The amino compound may contain one, two, three, four, five or any number of primary or secondary or primary and secondary amino groupings. From the foregoing formula it will be noted that when $n$ is 3 there will be no —NRR' groups attached to the triazine nucleus.

In practicing our invention the molar ratios between the reactants may be varied greatly depending, for example, upon the particular starting reactants employed and the particular end products desired. In general, however, when $n$ in Formula I is 1, the ingredients of (1) and (2) are employed in a molar ratio of 1 mole of the former to not less than 1 mole (preferably more than 1 mole) of the latter; when $n$ is 2, in a molar ratio of 1 mole of the former to not less than 2 moles (preferably more than 2 moles) of the latter; and when $n$ is 3, in a molar ratio of 1 mole of the former to not less than 3 moles (preferably more than 3 moles) of the latter. The reaction is effected by heating together the ingredients of (1) and (2) at a temperature sufficiently high to cause a phenol to be evolved by a by-product of the reaction, e. g., at the boiling point of the mixed reactants or of the solution or dispersion in which the reactants may be dissolved or dispersed, or above the fusion point of the mixed reactants if both are normally solids.

When R and R' in Formula I each represents a hydrogen atom the triazine derivative of (1) may be represented by the general formula:

II:

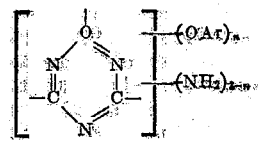

wherein Ar and $n$ have the same meanings as given above with reference to Formula I. However, there also may be used in practicing the present invention a triazine derivative represented by the general formula:

III:

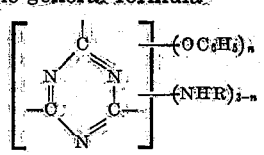

wherein R and $n$ have the same meanings as given above with reference to Formula I. When R in Formula III represents a hydrogen atom the triazine derivative employed as a starting reactant may be represented by the general formula:

IV:

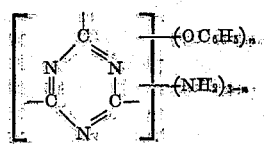

wherein $n$ has the same meaning as given above with reference to Formula I. The compounds embraced by Formula IV are triphenyl cyanurate (2,4,6-triphenoxy-1,3,5-triazine), 2-phenoxy-4,6-diamino-1,3,5-triazine and 2-amino-4,6-diphenoxy-1,3,5-triazine.

Illustrative examples of monovalent, monocyclic aromatic hydrocarbon radicals which Ar in Formulas I and II may represent are: phenyl, o-, m- and p-tolyl; 2,3-, 2,4-, 2,5-, 2,6-, 3,4- and 3,5-xylyl; 2,3-, 2,4-, 2,5-, 2,6-, 3,4- and 3,5-diethylphenyl; 2,3,5-trimethylphenyl; 2,4,6-trimethylphenyl, 2,3,4,6-tetramethylphenyl, pentamethylphenyl, o-, m- and p-ethylphenyl; -propylphenyl, -isopropylphenyl, -n-butylphenyl, -isobutylphenyl, p-amylphenyl, p-octadecylphenyl, 2,3-dipropylphenyl, 2,4-dioctylphenyl, etc. Preferably Ar represents a phenyl radical. Illustrative examples of monovalent hydrocarbon radicals which R in Formulas I and III may represent are: aliphatic (e. g., methyl, ethyl, propyl, isopropyl, n-butyl, sec.-butyl, amyl, isoamyl, hexyl, octyl, decyl, dodecyl, octadecyl, allyl, methallyl, crotyl, butenyl, oleyl, linalyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, 2-butenylphenyl, tert.-butylphenyl, etc.); and aryl-substituted aliphatic (e. g., benzyl, cinnamyl, phenylethyl, phenylpropyl, etc.).

The present invention is based on our discovery that a triazine derivative of the kind embraced by Formula I, e. g., triphenyl cyanurate, 2-amino-4,6-diphenoxy-1,3,5-triazine and 2-phenoxy-4,6-diamino-1,3,5-triazine, can be condensed under heat with a compound which is different therefrom and which is an amino compound containing carbon and at least one amino grouping having at least one hydrogen atom attached directly to the nitrogen atom thereof, e. g., cyclohexylamine, decamethylenediamine, mono- and diethanolamines, etc. A phenol having an aromatic nucleus corresponding to that represented by Ar in Formulas I and II is split off as a by-product of the reaction. In all cases heating is carried out at a temperature sufficiently high to cause condensation between the starting reactants and the evolution of the phenol by-product. During the course of the reaction the aryloxy group or groups are replaced by amino groups. If the aryloxytriazine contains more than one aryloxy grouping, the molar proportions of reactants and/or the conditions of the reaction may be so adjusted that only some of the aryloxy groupings are replaced by amino groups; in other words, stepwise replacement of the aryloxy substituents with amino substituents can be effected if desired. When all of the aryloxy groups are replaced by amino groups, a substituted melamine (usually a crystalline product) results when the amino compound is a monoamine, while a polymelamine is produced when the amino compound is a polyamine. The reaction proceeds in the desired direction to give a high yield of the desired condensation product. No side reactions appear to take place, which is in marked contrast to the results obtained when a trialkyl cyanurate or an alkoxy aminotriazine is caused to react with an amino compound of the kind used in practicing the present invention. In the latter case there is always some hydroxy-1,3,5-triazine formation, and this may be the predominant reaction.

Our invention makes possible the preparation of substituted melamines having particular utility as resin-forming intermediates (e. g., N,N'-diethylolmelamine, s-triethylolmelamine, etc.) more easily and economically than by other processes heretofore known. Thus, we have found that in many cases an aryloxytriazine can replace the corresponding chlorotriazine with advantage either because of the greater ease with which the reaction product can be isolated or because a product can be obtained from an aryloxytriazine that can not be secured by reaction of a chlorotriazine with an amine. An example of the latter condition is the preparation of tris(phenyl-β-hydroxyethylamino)-1,3,5-triazine, which also may be named tris(N-phenylethanolamino)-1,3,5-triazine, by reaction of triphenyl cyanurate with phenyl ethanolamine. The invention also makes possible the production of polymelamines by using a polyamine containing a plurality of hydrogen-containing amino groups, as well as condensation products which are resinous or potentially resinous materials.

The reaction between the aryloxytriazine and the amino compound may be carried out by batch, semi-continuous or continuous methods in any suitable apparatus. If desired, the evolved phenol may be removed substantially completely from the reaction zone as it is formed; or, only a portion of it may be removed from the reaction zone; or, especially in the case of the higher boiling substituted phenols which split off when the aryloxytriazine undergoing condensation with an amino compound is one in which the aryl radical of the aryloxy grouping is highly substituted or contains a high-molecular-weight aliphatic hydrocarbon substituent, all or a substantial portion of the evolved phenol may be allowed to remain in the reaction mass. The entire mass, either with or without first removing all or a part of any unreacted amino compound, then may be reacted with an aldehyde, e. g., formaldehyde, to yield a complex resinous material.

If a condensation product which is free or substantially free from the phenol by-product of the reaction be desired, this may be done by removing the phenol by-product from the reaction zone as it is formed, as was pointed out hereinbefore; or, all or a substantial part of the phenol or of any unreacted amino compound may be removed, as desired or as conditions may require, from the reaction mass at the end of the reaction period. For example, if the phenol or unreacted amino compound has a boiling point below the temperature of decomposition of the condensation product, such material may be removed from the reaction mass by distillation; or, the phenol and/or any excess amino compound may be extracted from the reaction mass with the aid of a suitable solvent or mixture of solvents, leaving the purified condensation product as a residue.

The temperature at which the reaction proceeds varies considerably depending, for example, upon the particular starting materials used, the other conditions of the reaction, and the extent of the reaction desired. Usually the temperature employed during at least a portion of the reaction period, more particularly toward the end of the period, is within the range of 170° C. (about 170° C.) to 350° C. (about 350° C.), preferably within the range of 170° C. to 250° C. (about 250° C.) or 300° C. (about 300° C.). Higher temperatures up to the decomposition temperature of the condensation product are not precluded, but no particular advantages appear to accrue therefrom. In some cases temperatures as low as 100° C. (about 100° C.) to 115° C. (about 115° C.), e. g., about 105° C., may be employed (see Examples 7 and 8), especially when the reaction is effected in a liquid medium in which the reactants are dissolved or dispersed. It is also possible in other cases to cause the reaction to proceed, at least during a portion of the reaction period, at temperatures of the order of 120° to 160° C., for example by carrying out the reaction under a reduced pressure (see Example 9).

The time of reaction may be varied as desired or as conditions may require, e. g., from 2 or 3 to 16 or 20, or even as much as 25 or 30 or more hours. The period of heating may be sufficiently long, if desired, so that the reaction proceeds to completion as evidenced by the fact that no more phenol by-product of the reaction is being evolved. Or, the reaction time may be of such limited duration that only a partial condensation product is obtained, that is to say, a product from which additional phenol could be split off if the product were heated further.

The reaction may be effected at atmospheric, subatmospheric or superatmospheric pressures. Superatmospheric pressures should be used when the amine reactant is of low boiling point and otherwise would volatilize from the reaction mass before reaching a reaction temperature, for instance, in the case of such relatively low boiling amines as dimethyl amine, diethyl amine and dipropyl amine. Reduced pressures often may be used advantageously, during all or part of the reaction period, in removing the phenol by-product, or any unreacted amino compound, or both these materials from the reaction mass.

The molar ratios between the reactants may be varied as described in the second paragraph of this specification. Ordinarily, at least 1 mole of amino compound, e. g., from 1 to 10 or more moles thereof, is used for each mole of monoaryloxytriazine; at least 2 moles of amino compound, e. g., from 2 to 20 or more moles thereof, for each mole of diaryloxytriazine; and at least 3 moles of amino compound, e. g., from 3 to 30 or more moles thereof, for each mole of triaryloxytriazine. When a completely condensed product is wanted, it is usually desirable to use the amino compound in excess of stoichiometrical proportions, for instance, from 5 to 50%, on a molar basis, in excess of the stoichiometrical amount required. Amounts of the amino compound in excess of the proportions hereinbefore mentioned may be employed, any substantial excess of amino compound above that required for the reaction merely serving as a solvent or diluent for the reactants during the reaction period. Thus, if desired, the reaction mixture may contain the triazine derivative and amino compound in stoichiometrical proportions, and additional amino compound in such excess that it constitutes from 5 to 90% by weight of the reaction mass.

If it be desired to produce a partial condensation product from a diaryloxy- or triaryloxytriazine this may be done, for instance, by using the amino compound in a molar proportion less than stoichiometrical proportions. For instance, a diaryloxytriazine may be condensed with one mole of an amino compound containing at least one amino grouping having a hydrogen atom attached directly to the amino nitrogen atom whereby one amino grouping replaces one of the aryloxy groupings attached to the triazine nucleus; or a triaryloxytriazine may be condensed with one or two moles of an amino compound of the kind used in practicing the present invention; whereby one or two amino groupings replace one or two aryloxy groupings of the triazine.

The reaction between the triazine derivative and the amino compound generally is effected by heating these materials together, as sole reactants, in the absence of a condensation catalyst at temperatures of the order of those hereinbefore set forth. Thus, when both the aryloxytriazine and the amino compound are normally solids, the reactants may be merely fused together and heated, for example, as little as from 1° to 10° C. or up to 50° or 100° C. or more above the mixed melting point of the reactants whereby the reaction is initiated and phenol by-product is evolved.

In some cases it may be preferred to effect the reaction while the reactants are dissolved or dispersed in a liquid solvent or dispersion medium in which the reactants and the reaction product are inert, e. g., ethers, monohydric and polyhydric alcohols, aliphatic and aromatic hydrocarbons, etc. Examples of such liquid media which may be employed are dioxane, trichloroethane, butanol, methyl amyl alcohol, hexanol, heptanol-2, ethylene glycol monomethyl ether, ethylene glycol monoethyl ether, ethylene glycol monobutyl ether, ethylene glycol ethylbutyl ether, diethylene glycol monomethyl ether, diethylene glycol monoethyl ether, diethylene glycol monobutyl ether, ethylene glycol, diethylene glycol, triethylene glycol, glycerine, xylene, etc. Solvents or dispersion media which boil within the range of 120° to 250° or 300° C. are preferred. Generally, however, the reaction is effected in the absence of any added solvent or dispersion medium other than an excess over stoichiometrical proportions of the amine reactant, which excess may function as a solvent or diluent during the reaction.

The by-product phenol and any unreacted amino compound may be separated from the reaction product in any suitable manner. For example, all or part of the phenol which splits off and all or part of any unreacted amino compound may be removed by distillation during the course of the reaction period or at the end of the reaction. The residue comprising the desired condensation product then may be extracted with a solvent or solvents which will remove any remaining phenol or unreacted material or other contaminants, leaving a residue of purified condensation product. Or, if desired, the purification step may be based on the removal of the undesired materials mainly by extraction rather than on distillation or a combination of distillation and extraction. Illustrative examples of solvents that may be employed in purifying the material by extraction are alcohols (e. g., methyl, ethyl, propyl, n-butyl, isobutyl and other aliphatic alcohols, both monohydric and polyhydric); aromatic hydrocarbons (e. g., benzene, toluene, xylene, etc.); ketones (e. g., acetone, etc.); or any other solvent or mixture of solvents or other treating agent which will remove the impurities from the crude condensation product.

Some of the products, e. g., those which contain a plurality of aldehyde-reactable amino (—NHR, specifically —NH$_2$) groups and/or aldehyde-reactable imino (—NH—) groups, are especially suitable for use in the preparation of resinous materials of the thermoplastic or of the thermosetting or potentially thermosetting types or kinds; thus, such products, either with or without partial or complete purification to remove any phenol by-product and/or unreacted starting materials or other contaminants, may be condensed with, for instance, aldehydes, including formaldehyde (or compounds engendering formaldehyde, e. g., hexamethylene tetramine, etc.); furfural, acrolein, etc., to yield condensation products having particular utility in the plastics and coating arts. Condensation products which are essentially resinous in character as initially produced may be used as such, if desired, in the plastics and coating arts; e. g., as modifiers of melamine-formaldehyde, urea-melamine - formaldehyde, urea - formaldehyde, thiourea-formaldehyde and other resinous materials with which they are compatible or can be rendered compatible.

The aryloxytriazines used in practicing our invention may be prepared by any suitable method. For instance, the triaryl cyanurates, e. g., triphenyl cyanurate, may be prepared in the manner described in the copending application of one of us (Frederic C. Schaefer), Serial No. 13,075, filed March 4, 1948. Or, aryloxytriazines of the kind embraced by Formula I may be prepared by reacting cyanuric chloride, or a monoamino (—NRR') dichloro-1,3,5-triazine or a monochloro diamino [(—NRR')₂] 1,3,5-triazine with equivalent amounts of sodium phenoxide in aqueous systems at temperatures within the range of 0° to 100° C., and isolating the aryloxytriazine thereby obtained. Reference is made to the copending application of Frederic C. Schaefer, Serial No. 18,063, filed concurrently herewith, for a more detailed description of the preparation of 2-amino-4,6-diphenoxy-1,3,5-triazine and 2-phenoxy-4,6-diamino-1,3,5-triazine. In a manner similar to the methods therein described, other monoaryloxy- and diaryloxytriazines of the kind embraced by Formula I may be produced by using equivalent amounts of the appropriate substituted amino chlorotriazine, or of the appropriate substituted phenol or of both in place of the unsubstituted amino chlorotriazine, or of the phenol (C₆H₅OH) or of both used in making 2-amino-4,6-diphenoxy-1,3,5-triazine and 2-phenoxy-4,6-diamino-1,3,5-triazine.

In order that those skilled in the art better may understand how the present invention may be carried into effect, the following examples are given by way of illustration and not by way of limitation. All parts and percentages are by weight, unless stated otherwise.

*Example 1*

|  | Parts | Approx. Mol Ratio |
|---|---|---|
| 2-Amino-4,6-diphenoxy-1,3,5-triazine | 27.6 | 1 |
| Ethanolamine (monoethanolamine) | 18.3 | 3 | were heated together for 1½ hours at 190° to 200° C. in a reaction vessel provided with a reflux air condenser. Thereafter 23.2 parts of volatile material (ethanolamine and phenol) was distilled off by heating the reaction mass up to 200° C. (residue temperature) at 40 mm. pressure. This was all of the distillate that could be obtained under the conditions used. The theoretical amount of excess ethanolamine (HOCH₂CH₂NH₂) and phenol by-product was 24.9 parts (6.1 parts ethanolamine and 18.8 parts of phenol). About 81 parts of butanol was added to the oily residue, and the mixture was refluxed briefly. This induced crystallization of the crude N,N'-diethylolmelamine, which also may be named 2-amino-4,6-di-(ethanolamino)-1,3,5-triazine and which was formed by the reaction between the ethanolamine and the 2-amino-4,6-diphenoxy-1,3,5-triazine. The crude product was filtered off, pulverized, washed with more butanol and then with ethyl ether, after which it was dried at 105° C. The amount of the dried product amounted to 19 parts, which represented a yield of about 89% based on the starting triazine reactant. It had a melting point of 155°–157° C. A purer product, M. P. 160°–161° C., was obtained by dissolving the crude material in 75 parts of hot water, treating the solution with a decolorizing carbon, filtering off the carbon, and allowing the product to recrystallize.

*Example 2*

Essentially the same procedure was followed as described under Example 1 with the exception that the reactants were heated together under reflux for 2½ hours at 180°–190° C. The yield of crude crystalline N,N'-diethylolmelamine, M. P. 160°–161.5° C., was the same as in Example 1. A purer product, M. P. 161°–162.5° C., was obtained by further processing the crude material as described under the prior example.

*Example 3*

Essentially the same procedure was followed as described under Example 1 with the exception that 183 parts of ethanolamine and 278 parts of a less pure grade of 2-amino-4,6-diphenoxy-1,3,5-triazine melting at 176°–182° C. were used, and the mixture consisting essentially of these reactants was heated under reflux for 3 hours at approximately 180° C. Thereafter 231 parts of distillate was distilled off under reduced pressure, which amount of distillate was all that could be obtained. To the resulting molten mass were added about 405 parts of butanol and about 2 to 4 parts of sodium hydrosulfite (Na₂S₂O₄) dissolved in about 15 parts of water, the latter being added as a bleaching agent for the N,N'-diethylolmelamine solution. The product crystallized rapidly from the butanol solution. After cooling the mass to room temperature, the solid crystals of N,N'-diethylolmelamine were filtered off, washed with butanol and dried at 105° C. The yield of dried crystals, M. P. 160°–162° C., amounted to 200 parts, which is 93.5% of the theoretical based on the 2-amino-4,6-diphenoxy-1,3,5-triazine used as a starting reactant.

*Example 4*

Three moles of 2-amino-4,6-diphenoxy-1,3,5-triazine and 9 moles of ethanolamine were heated together for 4 hours under reflux in a reaction vessel placed in a bath maintained at a temperature of 180°–210° C. Thereafter 651 parts (theoretical equals 747 parts) of volatile matter was distilled off, which amount of distillate was all that could be obtained. The dark-colored, syrupy residue was diluted while still hot with about 1215 parts of butanol (n-butanol). The mixture was thoroughly stirred during the addition of the butanol and thereafter while the mixture was allowed to cool to room temperature. While the mixture was still liquid (immediately after the butanol was added), a solution of 10 parts of sodium hydrosulfite in 50 parts of water was added, whereupon the color of the mixture became light tan. As the mixture cooled, N,N'-diethylolmelamine crystallized from the highly supersaturated solution. The crystals were washed with butanol and with acetone and thereafter were dried at 105° C. The yield of the product, M. P. 160°–161° C., amounted to 572 parts or 89% of the theoretical yield based on the starting triazine derivative. The material, which was slightly colored, could be recrystallized from water using 4 to 4.5 parts of water per part of N,N'-diethylolmelamine with no change in melting point and with a recovery of 60% of the product. The aqueous solution of the product may be treated with a decolorizing carbon prior to recrystallization. The remainder of the product could be recovered either by concentrating the aqueous mother liquor to solid state or by evaporating it to the consistency of a syrup and precipitating the N,N'-diethylolmelamine with butanol, using about 250 parts of butanol per 100 parts of N,N'-diethylolmelamine expected to be recovered.

The following equation illustrates the reaction which takes place when N,N'-diethylolmelamine is produced as described in the foregoing examples:

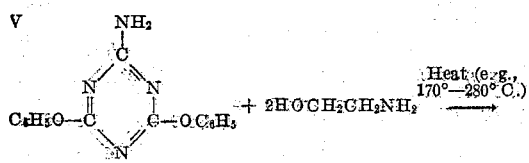

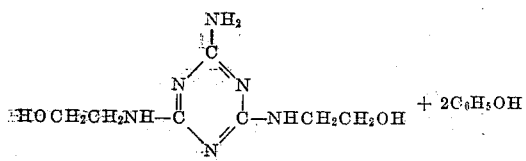

From the foregoing description, and especially from Examples 1-4, it will be seen that the present invention provides a new method of preparing N,N'-diethylolmelamine which comprises effecting a condensation reaction between (1) 2-amino-4,6-diphenoxy-1,3,5-triazine and (2) ethanolamine by heating a mixture of the same at a temperature within the range hereinbefore set forth, more particularly within the range of 170° C. to 280° C., until no more phenol is being evolved, the said mixture containing the ingredients of (1) and (2) in a molar ratio of 1 mole of the former to more than 2 moles of the latter. Thereafter, N,N'-diethylolmelamine is isolated from the resulting reaction mass.

As shown by Example 5, which follows, sym.-triethylolmelamine can be prepared by reacting triphenyl cyanurate and ethanolamine under similar temperature conditions using the reactants in a molar ratio of 1 mole of triphenyl cyanurate to more than 3 moles of ethanolamine.

Example 5

|  | Parts | Approx. Molar Ratio |
|---|---|---|
| Triphenyl cyanurate | 657 | 1 |
| Ethanolamine | 447 | 4 | were heated together for 5 hours under reflux, with stirring, in a reaction vessel placed in a bath maintained at 200°-210° C. The volatile material in the reaction mass was then distilled off as completely as possible by heating the mass under reduced pressure, whereby 614 parts of distillate was obtained (theoretical equals 628 parts). About 1130 parts of hot butanol was added to the residue, and the hot solution was filtered to remove a few parts of insoluble material. The black-colored filtrate was cooled to room temperature and seeded with a few crystals of sym.-triethylolmelamine. Crystals of sym.-triethylolmelamine crystallized slowly from the butanol solution. These crystals were filtered off and dried to obtain 352 parts of crude sym.-triethylolmelamine, M. P. 94°-95° C., which is about 75% of the theoretical amount based on triphenyl cyanurate. The crude product was recrystallized from about 710 parts of butanol (after treating the butanol solution with a decolorizing carbon), the resulting crystals then being filtered off, washed with butanol and with acetone, and dried in air. The recovery on recrystallization was 84%, and the nearly white sym.-triethylolmelamine thereby obtained melted at 98°-100° C.

Example 6

|  | Parts | Approx. Molar Ratio |
|---|---|---|
| Triphenyl cyanurate | 126 | 1 |
| Phenyl ethanolamine (C$_6$H$_5$-NH-CH$_2$CH$_2$OH) | 242 | 5 | were heated together in a distilling apparatus for 16 hours at 250° C. ±30° C. During the first two hours it was possible to distill about 50 parts of material which boiled below 210° C. (theoretical: 95 parts of phenol). At the end of the reaction period the reaction mass, which had become slightly darker in color during heating, was cooled to about 100° C. and then diluted with about 790 parts of ethanol. Crystallization began promptly and was allowed to proceed to completion over a period of about 1 hour while the mixture was chilled in a vessel surrounded by crushed ice. The crystals of crude tris(N - phenylethanolamino) - 1,3,5 - triazine, the formula for which is

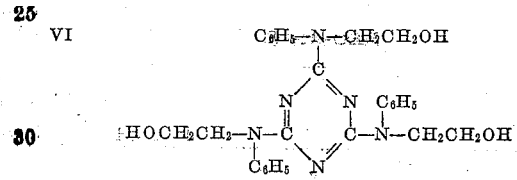

were filtered off and washed with ethanol until the washings were colorless. After drying at 105° C. the nearly white crystals amounted to 67 parts (theoretical equals 170 parts based on triphenyl cyanurate), M. P. 146°-152° C.

One thousand (1000) parts of water having dissolved therein 84 parts of sodium hydroxide was added to the ethanol washings to react with and water-solubilize any phenol present in the washings. This caused precipitation of an oil. The clear water-alcohol phase was decanted through a filter to collect a few crystals which were present. The oily residue was diluted with about 400 parts of ethanol, which resulted in extraction of the non-crystalline material and the separation of crystals of tris(N-phenylethanolamino)-1,3,5-triazine. These crystals were filtered off, washed well with alcohol and dried at 105° C. The yield of additional crystals (M. P. 160°-163° C.) obtained in this way amounted to 5.2 parts, which brought the total yield to 72.2 parts or about 42.7% of the theoretical.

The crude product was soluble in 5 cc. of boiling n-propanol per gram or in 12 cc. of boiling benzene per gram, and could also be recrystallized from these solvents. However, recrystallization from the aforementioned solvents was somewhat difficult due to the rapidity of crystallization on slight cooling. The product also could be recrystallized from 5 to 10% aqueous solutions of sulfuric acid.

Analysis of a sample of recrystallized tris(N-phenylethanolamino)-1,3,5,-triazine, which melted at 163°-164° C., gave the following results:

|  | Per cent C | Per cent H | Per cent N |
|---|---|---|---|
| Calculated for C$_{27}$H$_{30}$O$_3$N$_6$ | 66.61 | 6.22 | 17.27 |
| Found | 66.58 | 6.11 | 17.55 |
|  | 66.83 | 6.41 | 17.47 |

Example 7

|  | Parts | Approx. Molar Ratio |
|---|---|---|
| 2-Amino-4,6-diphenoxy-1,3,5-triazine | 150.0 | 1 |
| Cyclohexylamine | 52.7 | 1 |
| Dioxane | 260.0 |  | were heated together under reflux at the boiling temperature (about 105° C.) of the mass for 2 hours. At the end of this period there remained no odor of the amine. The reaction mass, which was a clear solution, was cooled with stirring until a solid material comprising crude 2 - amino - 4 - cyclohexylamino - 6 - phenoxy-1,3,5-triazine separated. The crude product was filtered off, washed with absolute alcohol and oven dried to yield 112 parts of a purer material, M. P. 215°–221° C.

The substitution of an equivalent amount of 2-phenoxy-4,6-diamino-1,3,5-triazine for 2-amino-4,6-diphenoxy-1,3,5-triazine in the above example yields 2-cyclohexylamino-4,6-diamino-1,3,5-triazine as the condensation product.

Example 8

|  | Parts | Approx. Molar Ratio |
|---|---|---|
| 2-Amino-4,6-diphenoxy-1,3,5-triazine | 150.0 | 1 |
| Cyclohexylamine | 105.4 | 2 |
| Dioxane | 260.0 |  |

The triazine derivative was added to the solution of cyclohexylamine and dioxane, and the resulting mixture was heated under reflux at the boiling temperature (about 105° C.) of the mass for 1½ hours. The mixture was cooled and filtered to isolate the solid reaction product which was formed. The solid was washed with alcohol and dried. The dried material melted at 218°–225° C. and comprised crude 2-amino-4-cyclohexylamino-6-phenoxy-1,3,5-triazine. The solid was combined with the filtrate and heated under reflux for 4 hours in a reaction vessel provided with a reflux condenser and which was placed in an oil bath maintained at a temperature of 170° C. The reaction mass was cooled and filtered to separate the solid reaction product which was present therein. The solid, after being washed with alcohol and dried, melted at 218°–225° C. and comprised crude 2-amino-4-cyclohexylamino-6-phenoxy-1,3,5-triazine.

Example 9

|  | Parts | Approx. Molar Ratio |
|---|---|---|
| 2-Amino-4,6-diphenoxy-1,3,5-triazine | 157.0 | 1 |
| Decamethylenediamine | 96.5 | 1 | were heated together for 3 hours at 120° to 160° C. under a reduced pressure of 20 mm., during which period 72 parts of phenol was distilled from the reaction mass. Heating was continued for 4 more hours at 170° to 265° C. under a pressure of 1 to 2 mm., whereby an additional amount of phenol was obtained. The total amount of phenol collected was 87 parts or about 83% of the theoretical. At 250° C. the condensation product (a linear polymelamine) was hard and non-tacky. On cooling to room temperature it became a very hard, clear, transparent mass. Upon refluxing the product with phenol, the material was swollen considerably by the phenol after refluxing for 2 hours but it did not dissolve even after refluxing for an additional 2 hours.

It is not essential that the amino compound which is caused to react with the aryloxytriazine be employed in the form of a free base. For instance, it may be employed in the form of a salt thereof. This is shown by the following example.

Example 10

|  | Parts | Approx. Molar Ratio |
|---|---|---|
| 2-Amino-4,6-diphenoxy-1,3,5-triazine | 27.6 | 1 |
| Bis(β-aminoethyl) sebacate bis (p-toluenesulfonate) | 63.2 | 1 | were heated together at 190° to 205° C. for 30 minutes under a reduced pressure of about 50 to 150 mm., during which period phenol was rapidly evolved. The amount of phenol collected was 13.9 parts or 75.6% of the theoretical. After heating for an additional 1 hour at 195°–205° C. under approximately the same reduced pressure, another 1 part of phenol was obtained thereby increasing the total yield of phenol to 81% of the theoretical.

The residue in the reaction vessel and which comprised a condensation product of 2-amino-4,6-diphenoxy-1,3,5-triazine and bis(β-aminoethyl) sebacate bis(p-toluenesulfonate) was a heavy resinous syrup at 180° C. At room temperature it was a clear, brittle, dark-colored, glassy mass with an oily feeling to the touch, probably as the result of the presence of a small amount of phenol.

The resinous solid was broken up. All of it could be dissolved in hot water with the exception of a small amount of insoluble oil which separated from the aqueous solution. Addition of a small amount of sodium hydroxide to the solution dissolved the oil, which presumably was phenol. The resin could be recovered from the aqueous solution either by evaporation of the water or by adding an organic liquid precipitant to precipitate the resin. The resin is suitable for use as a resin intermediate in forming aldehyde-reaction products thereof which are useful in the laminating and surface-coating arts.

The p-toluenesulfonic acid salt (di-salt) of bis(β-aminoethyl) sebacate used in the above example was prepared by heating together under reflux 101 grams of sebacic acid (0.5 mole), 61 grams of monoethanolamine (1.0 mole), 190 grams of p-toluenesulfonic acid (1.0 mole) and 600 cc. of toluene for 9 hours, during which period 36 cc. (theoretical equals 36 cc.) of water was azeotropically distilled off. The solid product which separated from the reaction mass was filtered off, washed with fresh toluene and dried at 110° C. The yield of bis(β-aminoethyl) sebacate bis(p-toluenesulfonate) was 315 grams, M. P. 170°–175° C., or about 99.7% of the theoretical.

Example 11

|  | Parts | Approx. Molar Ratio |
|---|---|---|
| Triphenyl cyanurate | 35.7 | 1 |
| 1-Aminoanthraquinone | 70.0 | 3 | were heated together at about 350° C. for 1 hour at atmospheric pressure in a distillation apparatus. At first a small amount of aminoanthraquinone sublimed, but within 15 minutes phenol began to distill from the reaction mass. At the end of the reaction period 27 parts of distillate had been collected (theoretical equals 28.2 parts of phenol). The distillate was diluted with about 100 parts of water and heated to 70°-80° C. to dissolve the phenol. The hot liquid contained about 1 to 2 parts of red needles of aminoanthraquinone, M. P. about 240° C., which were filtered off. The yield of phenol amounted to 25 to 26 parts or about 90 to 94% of the theoretical. The reaction mass comprising a condensation product of triphenyl cyanurate and 1-aminoanthraquinone was black. It was broken up and extracted with hot ethylene glycol monomethyl ether, leaving a black residue amounting to 70.2 parts.

*Example 12*

|  | Parts | Approx. Molar Ratio |
| --- | --- | --- |
| Triphenyl cyanurate | 53.5 | 1 |
| 1-Aminoanthraquinone | 100.0 | 3 | were heated together for 6 hours under reflux at 270°-285° C. in a reaction vessel provided with an air reflux condenser. After heating for 1 to 2 hours phenol was refluxing vigorously. The reaction mass was a solid at room temperature. It was pulverized and extracted with ether. The ether extract contained both phenol by-product and unreacted 1-aminoanthraquinone. The black residue amounted to 102 parts and comprised a condensation product of triphenyl cyanurate and 1-aminoanthraquinone.

It will be understood, of course, by those skilled in the art that our invention is not limited to the specific reactants and conditions of reaction named in the above illustrative examples. Thus, instead of the particular aryloxytriazine named in each of the above illustrative examples, we may use any other aryloxytriazine of the kind embraced by Formula I or by any of the more specific Formulas II and III, examples of which are:

Tri-o-toyyl cyanurate
Tri-m-tolyl cyanurate
Tri-p-tolyl cyanurate
Tri-(2,3-xylyl) cyanurate
Tri-(3-5-xylyl) cyanurate
Tri-(3,4-diethylphenyl) cyanurate
Tri-(2,4,6-trimethylphenyl) cyanurate
2 - phenoxy - 4 - amino-6-methylamino-1,3,5-triazine
2-phenoxy-4,6-diethylamino-1,3,5-triazine
2-(o-tolyloxy)-4,6-dianilino-1,3,5-triazine
2 - (p-tolyloxy) - 4,6 - dicyclohexylamino - 1,3,5 - triazine
2 - phenoxy-4-methylamino-6-anilino-1,3,5 - triazine
2-(m-tolyloxy) - 4,6-bis(dimethylamino) - 1,3,5 - triazine
2-phenoxy-4-amino-6-benzylamino-1,3,5-triazine
2-phenoxy-4-amino-6-tolylamino-1,3,5-triazine
2-methylamino-4,6-diphenoxy-1,3,5-triazine
2-anilino-4,6-di-(o-tolyloxy)-1,3,5-triazine
2-benzylamino-4,6-di-(3',5'-xyloxy) - 1,3,5 - triazine
2 - tolylamino - 4,6 - di - (p-ethylphenoxy)-1,3,5-triazine
2-(diethylamino)-4,6-diphenoxy-1,3,5-triazine
2-(allylamino)-4,6-diphenoxy-1,3,5-triazine
2-(cyclohexylamino)-4,6 - di-(2',4',6 - trimethylphenoxy)-1,3,5-triazine
2-phenoxy-4,6-di-(o-tolyloxy)-1,3,5-triazine
2-(p-tolyloxy)-4,6-diphenoxy-1,3,5-triazine
2 - phenoxy-4-dimethylamino - 6 - diethylamino-1,3,5-triazine
2 - phenoxy-4-methylamino - 6 - dipropylamino-1,3,5-triazine Other examples are given in the aforementioned copending application of Frederic C. Schaefer, Serial No. 18,063, while still other examples will be apparent to those skilled in the art from Formulas I, II and III and from the examples hereinbefore given of radicals that Ar, R and R' in one or another of these formulas may represent.

The amino compounds which are used in carrying the present invention into effect are those which contain carbon and at least one amino grouping having at least one hydrogen atom attached directly to the nitrogen atom thereof. If the amino compound is one which contains a plurality of amino groupings, one of such groupings may be unsubstituted or partly substituted and the remainder may be unsubstituted, partly substituted or completely substituted. The substituents attached to the nitrogen atom of the amino grouping or groupings may be, for instance, monovalent hydrocarbon radicals (examples of which have been given hereinbefore with reference to R and R' in Formula I), monovalent hydroxy-substituted hydrocarbon radicals, or radicals such, for example, as those represented by the general formulas:

1. $R_2NC(:NH)NH-$, e. g., guanido, etc.
2. $R_2NC(:NH)-$, e. g., guanyl, etc.
3. $R_2N-$, e. g., amino, methylamino, diethylamino, etc.
4. $R_2NCONH-$, e. g., ureido, methylureido, etc.
5. Pyrimidyl, $C_4H_2N_2-$(from pyrimidine)
6. Triazinyl, $C_3H_2N_3-$(from triazine)
7. Triazolyl, $C_2H_2N_3-$(from triazole), etc.

In the above formulas R represents hydrogen or a monovalent hydrocarbon radical, and where two R's appear in a formula they may be the same or different.

From the foregoing it will be seen that the carbon-containing amino compounds which may be employed in practicing our invention include, but are not limited to, those embraced by the following general formulas:

A.  $NHRR'$
B.  $HO-(R'')-NHR$
C.  $R-N-(R'')-NHR$
    $\quad\ \ |$
    $\quad\ \ R'$ wherein R and R' each represents hydrogen, so long as the compound also contains carbon, a monovalent hydrocarbon radical, a hydroxy-substituted monovalent hydrocarbon radical or any other monovalent radical including those listed above (groups 1 to 7 inclusive); and R'' represents a divalent organic radical such, for instance, as a divalent hydrocarbon radical (e. g., alkylene, arylene, arylalkylene, alkarylene, etc.), a divalent hydrocarbon radical containing at least one ether linkage (e. g., one, two, three, four, five or any number of ether linkages), an s-triazinylene radical (a divalent triazine), a pyrimidylene radical (a divalent pyrimidine), a triazolylene radical (a divalent triazole), etc. If the structure so permits, any number of $-NHR$ or $-NRR'$ groups (Formula C) ranging from one up to the combining power of the nucleus may be attached to the divalent radical represented by R''.

More specific examples of amino compounds which may be used in practicing our invention are listed below:

Butylamine (monobutylamine)
N-ethylbutylamine ($C_2H_5NHC_4H_7$)
Dibutylamine
2-amino-4-methylpentane

[$CH_3CHNH_2CH_2CH(CH_3)_2$]

n-Amylamine
Di-n-amylamine
Hexylamine
Dihexylamine
Heptylamine
Diheptylamine
Octylamine
Dioctylamine
Decylamine
Didecylamine
Octadecylamine
Dioctadecylamine
Ethylenediamine
1,3-diaminopropane ($NH_2CH_2CH_2CH_2NH_2$)
3-diethylaminopropylamine

[$(C_2H_5)_2NCH_2CH_2CH_2NH_2$]

1,3-diaminobutane ($NH_2CH_2CH_2CHNH_2CH_3$)
1,3-bis-ethylaminobutane

[$C_2H_5NHCH_2CH_2CHNH(C_2H_5)CH_3$]

1,4-diaminobutane
1,5-diaminopentane
1,6-diaminohexane
1,7-diaminoheptane
1,8-diaminoöctane
Diethylenetriamine ($NH_2CH_2CH_2NHCH_2CH_2NH_2$)

Triethylenetetramine

[$NH_2(CH_2CH_2NH)_2CH_2CH_2NH_2$]

Tetraethylenepentamine
Pentaethylenehexamine
Propylenediamine (1,2-diaminopropane)
Diethanolamine [$(HOCH_2CH_2)_2NH$]
Hydroxyethyl ethylenediamine ($NH_2CH_2CH_2NHCH_2CH_2OH$)

Monoisopropanolamine
Diisopropanolamine
Bis(3-aminopropyl) ether ($NH_2CH_2CH_2CH_2OCH_2CH_2CH_2NH_2$)

Bis(4-aminobutyl) ether
Bis(5-aminoamyl) ether
Bis(6-aminohexyl) ether
o-, m- and p-Phenylenediamines
Benzidine
2-aminobenzidine
Aminoguanidine
Guanidine
1,1-dimethylhydrazine
Semicarbazide
Aniline
N-butylaniline
o-, m- and p-Toluidines
o-, m- and p-Tolylenediamines
p,p'-Diaminodiphenyl ether
1,4-diaminoanthraquinone
p,p'-Diaminodiphenylmethane
4-amino-2-butanol ($CH_3CHOHCH_2CH_2NH_2$)
1-methylamino-2-propanol ($CH_3NHCH_2CHOHCH_3$)

5-isopropylamino-1-pentanol

[$HOCH_2CH_2CH_2CH_2CH_2NHCH(CH_3)_2$]

Melamine and the various other amino-1,3,5-triazines wherein at least one of the amino groups is either unsubstituted or only partly substituted, numerous examples of which are given, for instance, in Patent No. 2,320,813 and No. 2,361,823.

Aminopyrimidines and the various other amino-diazines wherein at least one of the amino groups is either unsubstituted or only partly substituted, numerous examples of which are given, for instance, in Patent No. 2,379,691.

Guanazole and the various other aminotriazoles wherein at least one of the amino groups is either unsubstituted or only partly substituted, numerous examples of which are given, for instance, in Patent No. 2,320,820.

Other examples will be apparent to those skilled in the art from Formulas A, B and C and from the definitions of R, R' and R'' in these formulas.

Autocondensation products of a compound represented by the formula

VII 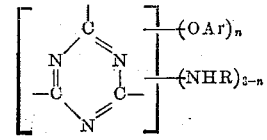

wherein Ar represented a monovalent, monocyclic aromatic hydrocarbon radical bonded to the oxygen atom through a carbon atom of the ring nucleus, R represents a member of the class consisting of hydrogen and monovalent hydrocarbon radicals, and $n$ represents an integer which is at least 1 and not more than 2, and methods of preparing the same, are disclosed and claimed in the copending application of Frederic C. Schaefer, Serial No. 18,063, filed concurrently herewith.

We claim:

1. The method of preparing a condensation product which comprises heating, at a temperature sufficiently high to cause a phenol to be evolved as a by-product of the reaction, a mixture of (1) a triazine derivative represented by the general formula

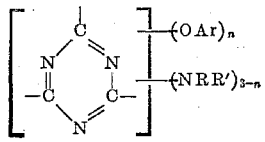

wherein Ar represents a monovalent, monocyclic aromatic hydrocarbon radical bonded to the oxygen atom through a carbon atom of the ring nucleus, R and R' each represents a member of the class consisting of hydrogen and monovalent hydrocarbon radicals and $n$ represents an integer which is at least 1 and not more than 3, and (2) a compound which is different from the triazine derivative of (1) and which is an amino compound containing carbon and at least one amino grouping having at least one hydrogen atom attached directly to the nitrogen atom thereof, the ingredients of (1) and (2) being employed in a molar ratio of 1 mole of the former to not less than 1 mole of the latter.

2. A method as in claim 1 wherein $n$ is 1 and the ingredients of (1) and (2) are employed in a molar ratio of 1 mole of the former to not less than 1 mole of the latter.

3. A method as in claim 1 wherein $n$ is 2 and the ingredients of (1) and (2) are employed in a molar ratio of 1 mole of the former to not less than 2 moles of the latter.

4. A method as in claim 1 wherein n is 3 and the ingredients of (1) and (2) are employed in a molar ratio of 1 mole of the former to not less than 3 moles of the latter.

5. A method as in claim 1 wherein Ar in the formula for the triazine derivative of (1) represents a phenyl radical.

6. A method as in claim 1 wherein Ar in the formula for the triazine derivative of (1) represents a phenyl radical and R and R' each represents a hydrogen atom.

7. A method as in claim 1 wherein the amino compound of (2) is a hydrocarbon amine having an amino grouping containing at least one hydrogen atom attached directly to its amino nitrogen atom.

8. A method as in claim 14 wherein the alkanol monoamine is an ethanol monoamine, the amino grouping thereof having at least one hydrogen atom attached directly to its amino nitrogen atom.

9. A method as in claim 8 wherein the ethanol monoamine is monoethanolamine.

10. The method of preparing N,N'-diethylolmelamine which comprises effecting a condensation reaction between (1) 2-amino-4,6-diphenoxy-1,3,5-triazine and (2) ethanolamine by heating a mixture of the same at a temperature within the range of 170° C. to 280° C. until no more phenol is being evolved, the said mixture containing the ingredients of (1) and (2) in a molar ratio of 1 mole of the former to more than 2 moles of the latter, and isolating N,N'-diethylolmelamine from the resulting reaction mass.

11. The method of preparing sym.-triethylolmelamine which comprises effecting a condensation reaction between (1) triphenyl cyanurate and (2) ethanolamine by heating a mixture of the same at a temperature within the range of 170° C. to 280° C. until no more phenol is being evolved, the said mixture containing the ingredients of (1) and (2) in a molar ratio of 1 mole of the former to more than 3 moles of the latter, and isolating sym.-triethylolmelamine from the resulting reaction mass.

12. A method as in claim 1 wherein Ar in the formula for the triazine derivative of (1) represents a phenyl radical and R and R' each represents a hydrogen atom, the amino compound of (2) is a hydrocarbon amine having an amino grouping containing at least one hydrogen atom attached directly to its amino nitrogen atom, and the temperature during at least a portion of the reaction period is within the range of 100° C. to 350° C.

13. The method of preparing N,N'-diethylolmelamine which comprises effecting a condensation reaction between (1) 2-amino-4,6-diphenoxy-1,3,5-triazine and (2) ethanolamine by heating a mixture of the same at a temperature within the range of 170° C. to 280° C. until no more phenol is being evolved, the said mixture containing the ingredients of (1) and (2) in a molar ratio of 1 mole of the former to more than 2 moles of the latter, adding butanol to the residue to induce crystallization of crude N,N'-diethylolmelamine, and separating and purifying the said N,N'-diethylolmelamine.

14. The method of preparing a condensation product which comprises heating, at a temperature sufficiently high to cause a phenol to be evolved as a by-product of the reaction, a mixture of (1) a triazine derivative represented by the general formula

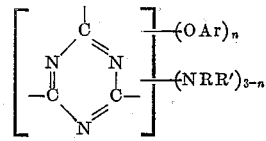

wherein Ar represents a monovalent, monocyclic aromatic hydrocarbon radical bonded to the oxygen atom through a carbon atom of the ring nucleus, R and R' each represents a member of the class consisting of hydrogen and monovalent hydrocarbon radicals and n represents an integer which is at least 1 and not more than 3, and (2) an alkanol monoamine, the amino grouping thereof having at least one hydrogen atom attached directly to its amino nitrogen atom, the ingredients of (1) and (2) being employed in a molar ratio of 1 mole of the former to not less than 1 mole of the latter.

15. The method of preparing a condensation product which comprises heating, at a temperature sufficiently high to cause phenol to be evolved as a by-product of the reaction, a mixture of (1) a triazine derivative represented by the general formula

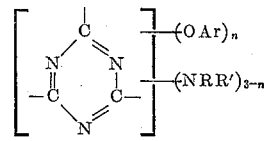

wherein Ar represents a phenyl radical bonded to the oxygen atom through a carbon atom of the phenyl nucleus, R and R' each represents a hydrogen atom and n represents an integer which is at least 1 and not more than 3 and (2) an alkanol monoamine, the amino grouping thereof having at least one hydrogen atom attached directly to its amino nitrogen atom, and the temperature during at least a portion of the reaction period is within the range of 100° C. to 350° C.

FREDERIC CHARLES SCHAEFER.
DAGFRID HOLM-HANSEN CHURCH.

REFERENCES CITED

The following references are of record in the file of this patent:

UNITED STATES PATENTS

| Number | Name | Date |
|---|---|---|
| 2,361,823 | D'Alelio | Oct. 13, 1944 |

FOREIGN PATENTS

| Number | Country | Date |
|---|---|---|
| 348,360 | Italy | 1937 |

OTHER REFERENCES

Beilstein, pp. 126 and 127, vol. 26, 4th ed., 1937.
McClellan Ind. and Engineering Chemistry, Sept. 1940, p. 1183.